UNITED STATES PATENT OFFICE.

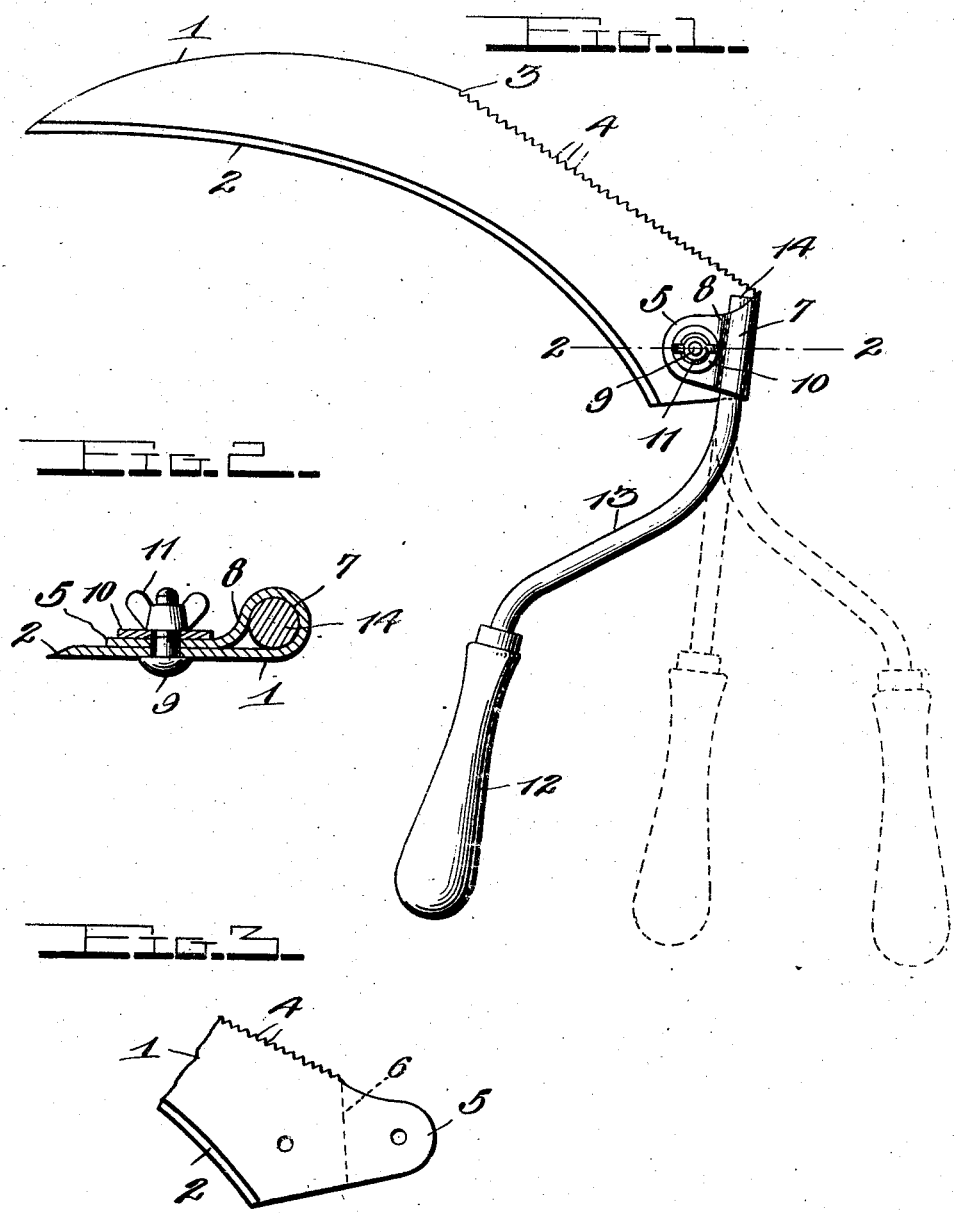

ALBERT A. BATES, OF EAST HIGHGATE, VERMONT.

COMBINED GRASS-HOOK, CORN-KNIFE, AND PRUNING-SAW.

1,021,444.  Specification of Letters Patent.  Patented Mar. 26, 1912.

Application filed June 24, 1911. Serial No. 635,137.

*To all whom it may concern:*

Be it known that I, ALBERT A. BATES, a citizen of the United States, residing at East Highgate, in the county of Franklin and State of Vermont, have invented certain new and useful Improvements in Combined Grass-Hooks, Corn-Knives, and Pruning-Saws, of which the following is a specification, reference being had to the accompanying drawings.

This invention is an improved combined grass-hook, corn knife anr pruning saw and consists in the construction, combination and arrangement of devices hereinafter described and claimed.

The object of the invention is to provide an improved implement of this kind which may be used either for the purposes of a grass hook, corn knife or pruning saw, which is extremely cheap and simple and which is so constructed that the handle may be readily attached thereto and removed therefrom and may be also adjusted to any desired angle with respect to the blade.

In the accompanying drawings: Figure 1 is a plan of a combined grass hook, corn knife and pruning saw constructed in accordance with my invention, the handle being shown in full lines in one position and in other positions in dotted lines; Fig. 2 is a detail transverse sectional view of the same on the plane indicated by the line 2—2 of Fig. 1; and Fig. 3 is a detail plan of a portion of the blade when the latter is in its initial position prior to the bending of the tang which forms the handle engaging clamp.

In accordance with my invention the blade 1, which is curved as shown and provided at its front concave edge with a beveled cutting edge 2, is also provided on its rear side, at that portion thereof which presents a straight edge 3, with a series of saw teeth 4. At the inner end and rear side of the blade, which is flat, is formed a tang 5 which is bent forwardly over the blade and obliquely with respect thereto on the line 6 indicated in Fig. 3 so that the tang forms a cylindrical socket 7 between it and the upper side of the blade and also forms a clamping arm 8 which bears above the blade. A bolt 9, which has its head on the under side of the blade, passes through alined openings in the blade and the clamping arm of the tang, and is provided with a washer 10 which bears on said clamping arm and a wing nut 11 to bear on the washer.

The handle 12 has a rod 13 which is cylindrical cross sectionally and is bent longitudinally in the form of a compound curve and terminates at its inner end in a straight portion 14 which is adapted to be fitted in the space or socket between the tang and the rear outer corner of the blade. The tang may be adjusted, by means of the bolt and nut, so as to cause it to securely clamp or to release the end of the rod and hence the handle may be detached from the blade at will by first partly unscrewing the nut, and the handle may also be set with its bar or rod 13, which, in effect, forms a portion of the handle, either in a common plane with or at any desired angle with respect to the blade to adapt the tool to be used either for the purposes of a grass hook, a corn knife or a pruning saw as will be understood.

Since the clamping tang is formed integral with the blade and bent therefrom, the tool may be very economically manufactured and hence it may be sold for a low price. Moreover, by thus providing the clamping tang so that the handle may be set at any desired angle with respect to the blade or in the common plane of the blade as may be desired, the tool is adapted for use for a variety of purposes. Moreover, since the construction of the handle with its S-shaped extended bar and the construction of the blade with its integral clamping tang admits of the ready detachment of the handle from the blade, the tool, when the handle is detached therefrom, may be readily packed in a very small space, thus greatly economizing both in freight and storage.

Having thus described my invention I claim:

The herein described grass hook comprising a longitudinally curved blade formed at its inner end at its outer corner with an integral tang which is bent over from the metal out of which the blade is formed and which embodies a clamping portion parallel with and spaced from the blade and a curved socket portion, the socket being entirely above the plane of the blade, so that the lower side of the blade will present an unobstructed flat surface, a handle having a curved rod projecting from one end thereof and with the handle forming a compound curve, one end of the rod being mounted in the socket of the tang and adapted to be turned therein, and a clamping bolt extending through the blade and tang, connecting the free end of the tang to the blade, whereby the handle rod is detachably connected to the blade and is also permitted to be turned in the socket to angularly adjust the handle with respect to the blade.

In testimony whereof I hereunto affix my signature in the presence of two witnesses.

ALBERT A. BATES.

Witnesses:
 CLARK E. FISHER,
 DANIEL W. STEELE.